United States Patent
Watanabe

(10) Patent No.: US 6,507,432 B1
(45) Date of Patent: Jan. 14, 2003

(54) BRIGHT WIDE-ANGLE INFRARED LENS

(75) Inventor: Fumio Watanabe, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 132 days.

(21) Appl. No.: 09/613,835

(22) Filed: Jul. 11, 2000

(30) Foreign Application Priority Data

Jul. 26, 1999 (JP) .......................................... 11-210100

(51) Int. Cl.$^7$ .......................... G02B 13/14; G02B 9/12; G02B 9/14

(52) U.S. Cl. ...................... 359/356; 359/355; 359/350; 359/784; 359/785

(58) Field of Search ................................ 359/355, 356, 359/357, 642, 784, 785, 757, 649

(56) References Cited

U.S. PATENT DOCUMENTS

| | | | |
|---|---|---|---|
| 4,030,805 A | | 6/1977 | Rogers |
| 4,907,865 A | * | 3/1990 | Ichiki et al. ................. 359/757 |
| 5,044,706 A | * | 9/1991 | Chen ........................... 359/357 |
| 5,066,113 A | * | 11/1991 | Nakajima et al. ........... 359/649 |
| 5,940,219 A | * | 8/1999 | Yamada ....................... 359/642 |

FOREIGN PATENT DOCUMENTS

GB 1345 505 1/1974

OTHER PUBLICATIONS

Japanese Patent Office, "Patent Abstracts of Japan," Publication No.: 52085834 A, Date of Publication: Jul. 16, 1977, App No.: 51001961, Date of Filing: Jan. 9, 1976, pp. 219–223 w/ Abstract in English.

Japanese Patent Office, "Patent Abstracts of Japan," Publication No.: 52086344 A, Date of Publication: Jul. 18, 1977, App No.: 51003002, Date of Filing: Jan. 13, 1976, pp. 227–231, w/ Abstract in English.

Japanese Patent Office, Publication No. 52–100247, Date of Publication: Aug. 23, 1977, App No. 51–17330, Date of Filing: Feb. 19, 1976, pp. 245–248.

Japanese Patent Office, "Patent Abstracts of Japan," Publication No.: 62005211 A, Date of Publication: Jan. 12, 1987, App No.: 60142443, Date of Filing: Jul. 1, 1985, pp. 57–61, w/ Abstract in English.

Japanese Patent Office, "Patent Abstracts of Japan," Publication No.: 6203028 A, Date of Publication: Feb. 9, 1987, App No.: 60168557, Date of Filing: Aug. 1, 1985, pp. 55–60, w/ Abstract in English.

* cited by examiner

Primary Examiner—Audrey Chang
(74) Attorney, Agent, or Firm—Snider & Associates; Ronald R. Snider

(57) ABSTRACT

A bright wide-angle infrared lens, suitable for a wavelength band of 8 to 12 $\mu$m, having favorable imaging performances comprises, successively from the object side, a first lens $L_1$ made of a positive meniscus lens having a convex surface directed onto the object side and an image-side surface formed aspheric, a second lens $L_2$ made of a negative meniscus lens having a convex surface directed onto the object side, and a third lens $L_3$ having a positive refracting power with a convex surface directed onto the object side.

5 Claims, 6 Drawing Sheets

FIG. 4A
EXAMPLE 1
F/0.70
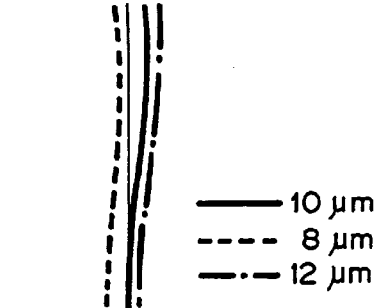
— 10 μm
---- 8 μm
—·— 12 μm
SPHERICAL ABERRATION
FIG. 4B
EXAMPLE 1
ω=10.4°
— SAGITTAL
---- TANGENTIAL
ASTIGMATISM
FIG. 4C
EXAMPLE 1
ω=10.4°
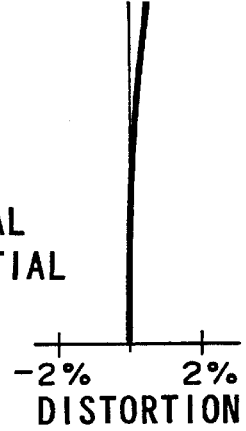
DISTORTION
FIG. 4D
EXAMPLE 1
COMA
ω=10.4°
ω=7.4°
ω=4.2°
ω=0°

FIG. 5A
EXAMPLE 2
F/0.65

— 10 μm
--- 8 μm
-·- 12 μm

-0.2　0.2
SPHERICAL
ABERRATION

FIG. 5B
EXAMPLE 2
ω=8.9°

— SAGITTAL
--- TANGENTIAL

-0.2　0.2
ASTIGMATISM

FIG. 5C
EXAMPLE 2
ω=8.9°

-2%　2%
DISTORTION

FIG. 5D
EXAMPLE 2

COMA
0.2
-0.2
ω=8.9°

0.2
-0.2
ω=6.3°

0.2
-0.2
ω=3.6°

0.2
-0.2
ω=0°

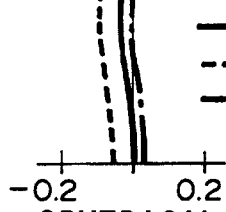
FIG. 6A
EXAMPLE 3
F/0.65
SPHERICAL ABERRATION
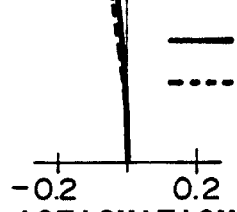
FIG. 6B
EXAMPLE 3
$\omega = 10.4°$
ASTIGMATISM
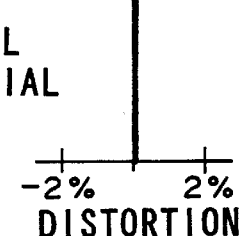
FIG. 6C
EXAMPLE 3
$\omega = 10.4°$
DISTORTION
FIG. 6D
EXAMPLE 3
COMA
$\omega = 10.4°$
$\omega = 7.4°$
$\omega = 4.2°$
$\omega = 0°$

BRIGHT WIDE-ANGLE INFRARED LENS

RELATED APPLICATIONS

This application claims the priority of Japanese Patent Application No. 11-210100 filed on Jul. 26, 1999, which is incorporated herein by reference.

BACKGROUND OF THE INVENTION

1. Field of the Invention

The present invention relates to an infrared lens; and, in particular, to a bright wide-angle infrared lens employed in an infrared imaging system in a wavelength band of 8 to 12 μm.

2. Description of the Prior Art

Known as detectors employed in infrared imaging systems are those of cooling type such as those in hybrid mode (using InSb or HgCdTe) and Schottky barrier form (using PtSi), and non-cooling type using a thermopile or microbolometer. As characteristics of these types, the cooling type is problematic in that it is expensive and hard to be made compact though it can achieve a high sensitivity, whereas the non-cooling type has a temperature resolution lower than that of the cooling type though being able to achieve a lower cost and compactness. Therefore, in either case, it is desirable that bright lenses be used in optical systems for collecting the heat radiated from an object, i.e., infrared rays, and forming an image on a detector surface in order to improve noise equivalent temperature difference (hereinafter referred to as NETD). In particular, for enhancing the sensitivity in the non-cooling type, bright lenses having a very small F number are required.

While crystal materials such as Ge, Si, and ZnSe are employed as optical materials transmitting infrared rays therethrough, these materials are quite expensive, whereby they increases the cost greatly if the number of lenses is large. Also, depending on the materials, the ratio of light absorption is so much that the decrease in transmissivity becomes problematic when lenses are made thicker or the number of lenses increases, whereby NETD may deteriorate greatly. Hence, there is a strong demand for infrared lenses to cut down their number, and there is also a demand for compact lenses in order to respond to smaller dimensions of cameras themselves.

Further, as the number of pixels increases in detectors, sufficient imaging performances and wider field of view are required.

As conventional techniques having solved such problems to a certain extent, those disclosed in the following publications have been known:

U.K. Patent Publication No. 1,345,505 (Fno=0.80, 2ω=35°, three-element lens configuration);

U.S. Pat. No. 4,030,805 (Fno=0.59, 2ω=16.5°, four-element lens configuration);

Japanese Unexamined Patent Publication No. 52-85834 (Fno=1.0, 2ω=9.2°, three-element lens configuration);

Japanese Unexamined Patent Publication No. 52-86344 (Fno=0.9, 2ω=19°, three-element lens configuration);

Japanese Unexamined Patent Publication No. 52-100247 (Fno=0.8, 2ω=18°, four-element lens configuration);

Japanese Unexamined Patent Publication No. 62-5211 (Fno=0.9, 2ω=10.2°, three-element lens configuration); and Japanese Unexamined Patent Publication No. 62-30208 (Fno=0.8, 2ω=10.2°, three-element lens configuration).

Though the techniques disclosed in the above-mentioned publications satisfy some of the above-mentioned demands, none of them satisfies all the demands. For example, those yielding a small F number with a brightness and wide field of view may yield very large coma and curvature of field, thus being problematic in terms of performances.

SUMMARY OF THE INVENTION

In view of the foregoing circumstances, it is an object of the present invention to provide a bright wide-angle infrared lens, in a compact configuration of three elements, exhibiting favorable performances though having a very small F number and a wide field of view.

The present invention provides a bright wide-angle infrared lens comprising, successively from an object side, a first lens made of a meniscus lens having a positive refracting power with a convex surface directed onto the object side, a second lens made of a meniscus lens having a negative refracting power with a convex surface directed onto the object side, and a third lens having a positive refracting power with a convex surface directed onto the object side, at least one surface of the first lens being formed aspheric.

Preferably, the infrared lens satisfies the following conditional expressions (1), (2), and (3):

$$1.50 < f_{1\text{-}2}/f \tag{1}$$

$$0.45 < f_3/f < 0.65 \tag{2}$$

$$0.55 < D_{2\text{-}3}/f < 0.80 \tag{3}$$

where f is the focal length of the whole system;

$f_{1\text{-}2}$ is the composite focal length of the first and second lenses;

$f_3$ is the focal length of the third lens; and $D_{2\text{-}3}$ is the air space between the second and third lenses.

Preferably, the image-surface-side surface of the first lens and the object-side surface of the third lens are formed aspheric.

Preferably, all of the first, second, and third lenses are formed from germanium and are used for a wavelength band of 8 to 12 μm.

BRIEF DESCRIPTION OF THE DRAWINGS

FIGS. 4A to 4D are aberration charts showing various kinds of aberration (spherical aberration, astigmatism, distortion, and coma) of the bright wide-angle infrared lens in accordance with Example 1 of the present invention;

FIGS. 5A to 5D are aberration charts showing various kinds of aberration (spherical aberration, astigmatism, distortion, and coma) of the bright wide-angle infrared lens in accordance with Example 2 of the present invention; and FIGS. 6A to 6D are aberration charts showing various kinds of aberration (spherical aberration, astigmatism, distortion, and coma) of the bright wide-angle infrared lens in accordance with Example 3 of the present invention.

DESCRIPTION OF THE PREFERRED EMBODIMENTS

In the following, specific embodiments of the present invention will be explained with reference to the drawings.

Figure 1A:
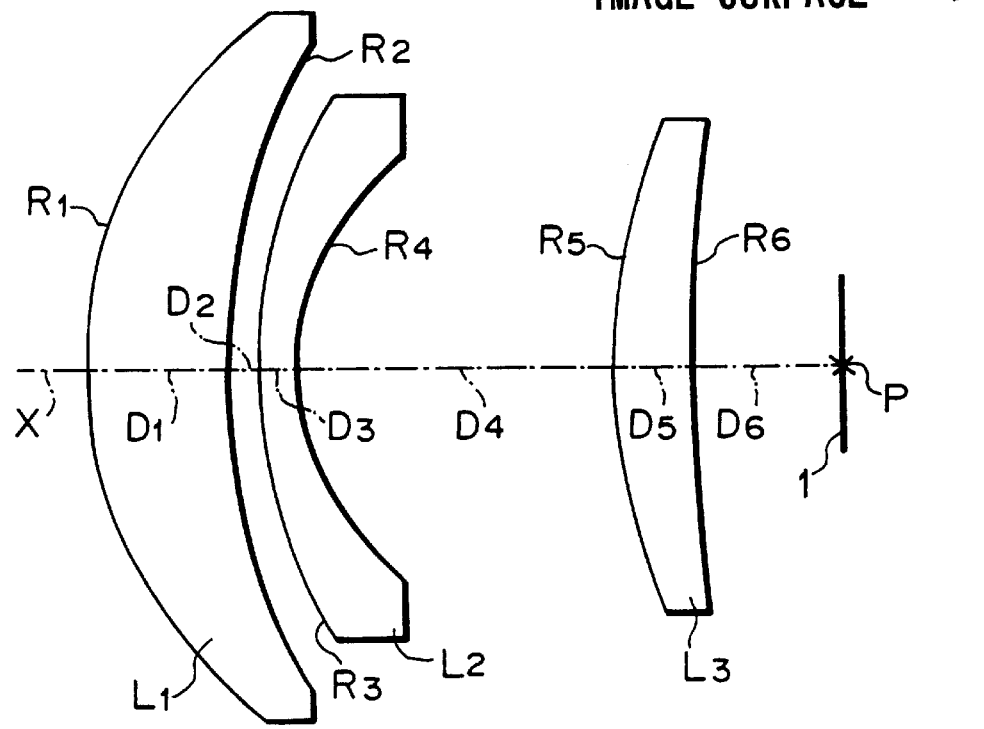
FIGS. 1A and 1B are views showing the lens configuration of the bright wide-angle infrared lens in accordance with Example 1 of the present invention.
Figure 1B:
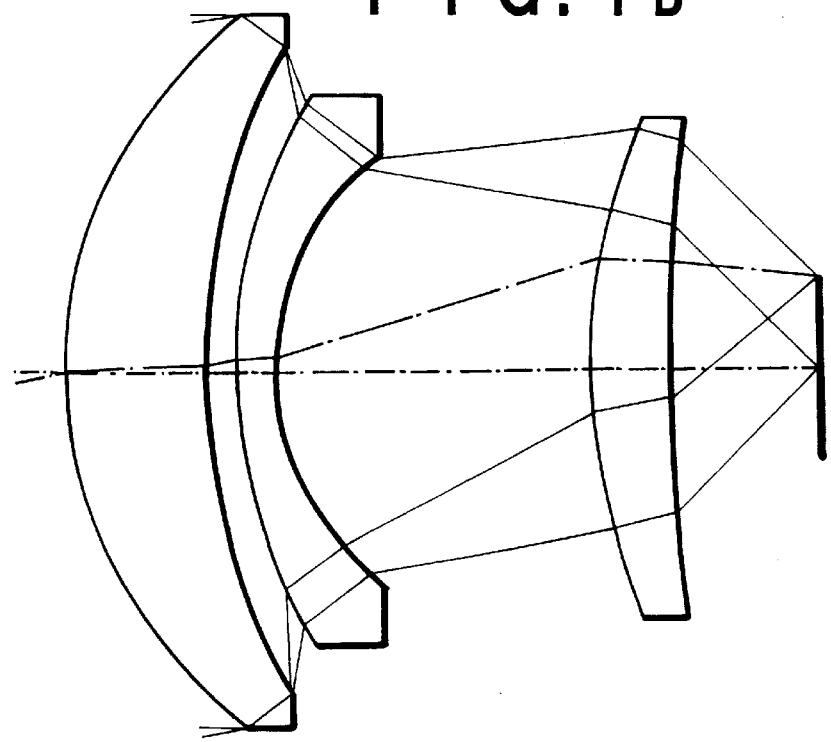

The bright wide-angle infrared lens of the embodiment shown in FIGS. 1A and 1B (representing that of Example 1) comprises, successively from the object side, a first lens $L_1$ made of a meniscus lens having a positive refracting power with a convex surface directed onto the object side, a second lens $L_2$ made of a meniscus lens having a negative refracting power with a convex surface directed onto the object side, and a third lens $L_3$ made of a meniscus lens having a positive refracting power with a convex surface directed onto the object side. A luminous flux from the object is converged by the three lenses $L_1$ to $L_3$, so as to form an image at an imaging position P on a detection surface 1 of a detector. In the drawings, X indicates the optical axis. The image-surface-side surface of the first lens $L_1$ is formed aspheric, and this aspheric surface form is represented by the following aspheric surface form expression:

$$Z = \frac{\frac{Y^2}{R}}{1 + \sqrt{1 - K\frac{Y^2}{R^2}}} + A_4 Y^4 + A_6 Y^6 + A_8 Y^8 + A_{10} Y^{10}$$

where

Z is the length of the perpendicular to a tangential plane (plane perpendicular to the optical axis) of an apex of the aspheric surface from a point on the aspheric surface having a height Y from the optical axis;

Y is the height from the optical axis;

K is the eccentricity;

R is the paraxial radius of curvature of the aspheric surface; and $A_4$, $A_6$, $A_8$, and $A_{10}$ are aspheric surface coefficients.

Also, this bright wide-angle infrared lens is configured so as to satisfy the following conditional expressions (1), (2), and (3):

$$1.50 < f_{1-2}/f \quad (1)$$

$$0.45 < f_3/f < 0.65 \quad (2)$$

$$0.55 < D_{2-3}/f < 0.80 \quad (3)$$

where f is the focal length of the whole system;

$f_{1-2}$ is the composite focal length of the first lens $L_1$ and second lens $L_2$;

$f_3$ is the focal length of the third lens $L_3$; and $D_{2-3}$ is the air space between the second lens $L_2$ and third lens $L_3$.

Here, all of the first lens $L_1$, second lens $L_2$, and third lens $L_3$ are formed from germanium.

Operations and effects of this embodiment will now be explained.

Since the first lens $L_1$ made of a positive meniscus lens having a convex surface directed onto the object side and the second lens $L_2$ made of a negative meniscus lens having a convex surface directed onto the object side are successively disposed from the object side whereas at least one surface of the first lens $L_1$ is formed aspheric, spherical aberration and coma can be corrected favorably. Also, since the positive third lens $L_3$ having a convex surface directed onto the object side is disposed, curvature of field and astigmatism can be corrected with a favorable balance. Such a configuration can yield a bright and wide-angle infrared lens exhibiting favorable performances in spite of the number of lenses as small as 3.

Conditional expressions (1) to (3) are conditions for making the above-mentioned aberration corrections more favorable. If conditional expression (1) is satisfied, then spherical aberration and coma will be corrected favorably. If the third lens $L_3$ satisfying conditional expression (2) is disposed with a predetermined distance from the second lens $L_2$ so as to satisfy conditional expression (3), curvature of field and astigmatism can be corrected with a favorable balance. Conditional expression (2) also acts as a condition for securing a necessary back focus while making the total lens length compact.

If the aspheric surface to be formed in the first lens $L_1$ is formed on its image-surface-side surface, then spherical aberration and coma can be corrected more favorably, whereby an infrared lens having a wide angle in spite of a small F value with a brightness can be obtained. Also, from the viewpoint of lens processing as well as aberration correction, it is preferred that an aspheric surface be formed on the image-surface-side surface, which is a relatively weak spherical surface.

As for the lens material, germanium has a characteristic that it has a high refractive index whereas its dispersion is very small in a wavelength band of 8 to 12 $\mu$m. Therefore, if all of the first lens $L_1$, second lens $L_2$, and third lens $L_3$ are formed from germanium, then a very bright wide-angle infrared lens suitable for the wavelength band of 8 to 12 $\mu$m can be obtained.

EXAMPLES

In the following, Examples 1 to 3 of the present invention will be explained specifically.

Example 1

The bright wide-angle infrared lens in accordance with Example 1 is configured as explained with reference to the above-mentioned embodiment. Its basic configuration is shown in FIG. 1A. Also, as shown in the ray-tracing view of FIG. 1B, this lens can transmit therethrough substantially 100% of a luminous flux carrying object information without any eclipse up to the marginal part of luminous flux, whereby a bright infrared lens with a wide field of view can be obtained.

Table 1 (follows) shows the radius of curvature R of each lens surface, the axial surface space of each lens (center thickness of each lens and air space between each pair of neighboring lenses) D, the refractive index N of each lens at a wavelength of 10 $\mu$m, and the material forming each lens in Example 1. In Examples 1 to 3, the above-mentioned radius of curvature R and axial surface distance D are standardized with the focal length f of the whole lens system being taken as 100.0. In Table 1 and its subsequent Tables, numbers referring to each symbol successively increase from the object side, whereas "*" on the left side of numerals indicates an aspheric surface.

The lower part of Table 1 shows the respective values of individual constants of the aspheric surface indicated in the above-mentioned aspheric surface form expression in Example 1.

Example 2

Figure 2A:
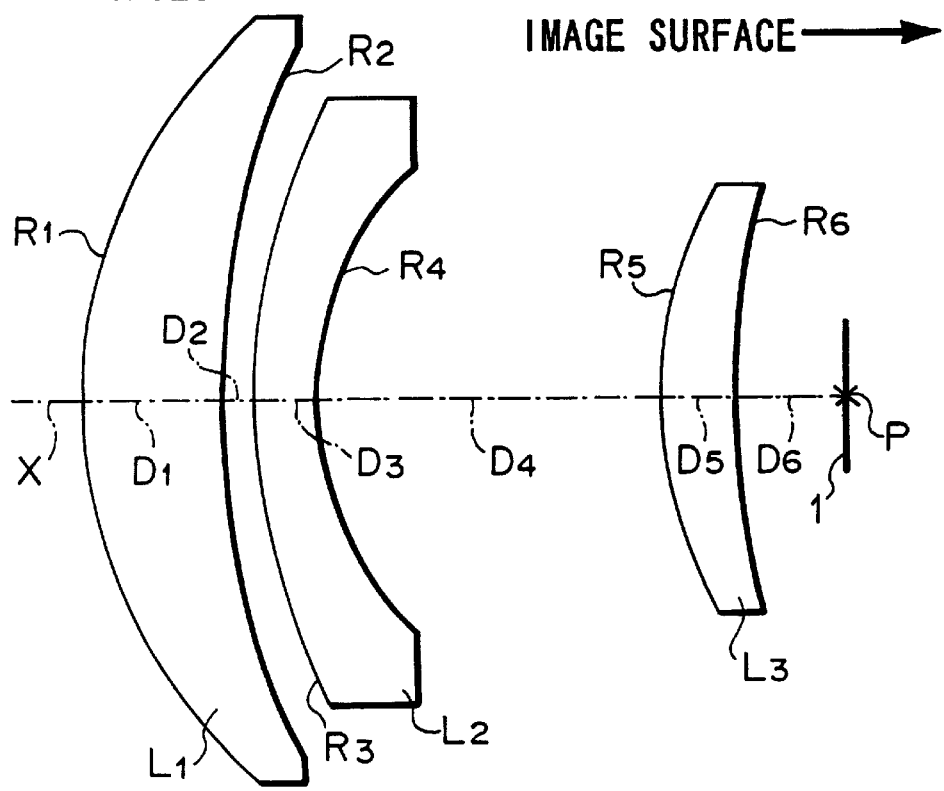
FIGS. 2A and 2B are views showing the lens configuration of the bright wide-angle infrared lens in accordance with Example 2 of the present invention.
Figure 2B:
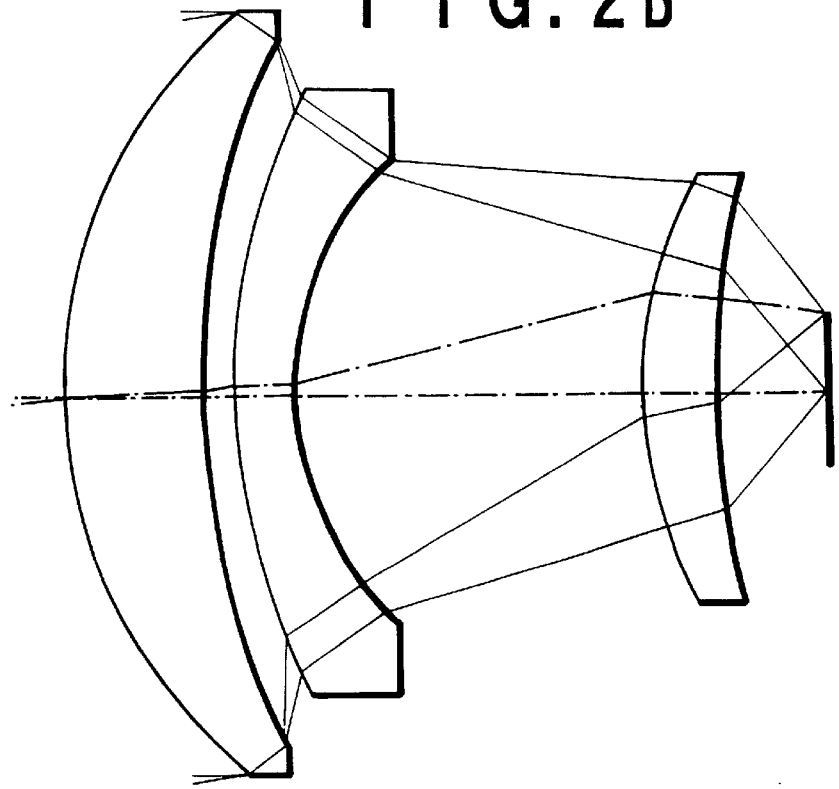

The bright wide-angle infrared lens in accordance with Example 2 is configured as explained with reference to the above-mentioned embodiment. Its basic configuration is shown in FIG. 2A. Also, as shown in the ray-tracing view of FIG. 2B, this lens can transmit therethrough substantially 100% of a luminous flux carrying object information without any eclipse up to the marginal part of luminous flux, whereby a bright infrared lens with a wide field of view can be obtained.

Table 2 (follows) shows the radius of curvature R of each lens surface, the axial surface space of each lens (center thickness of each lens and air space between each pair of neighboring lenses) D, the refractive index N of each lens at a wavelength of 10 μm, and the material forming each lens in Example 2. The lower part of Table 2 shows the respective values of individual constants of the aspheric surface indicated in the above-mentioned aspheric surface form expression in Example 2.

Example 3

The bright wide-angle infrared lens in accordance with Example 3 is configured substantially as explained with reference to the above-mentioned embodiment, except that the object-side surface of the third lens $L_3$ is formed aspheric in addition to the image-surface-side surface of the first lens $L_1$. This aspheric surface form is represented by the above-mentioned aspheric surface form expression as in the aspheric surface form of the first lens $L_1$. Since the object-side surface of the third lens $L_3$ is also made aspheric, coma can be corrected more favorably, whereby a brighter wider-angle infrared lens can be obtained.

Figure 3A:
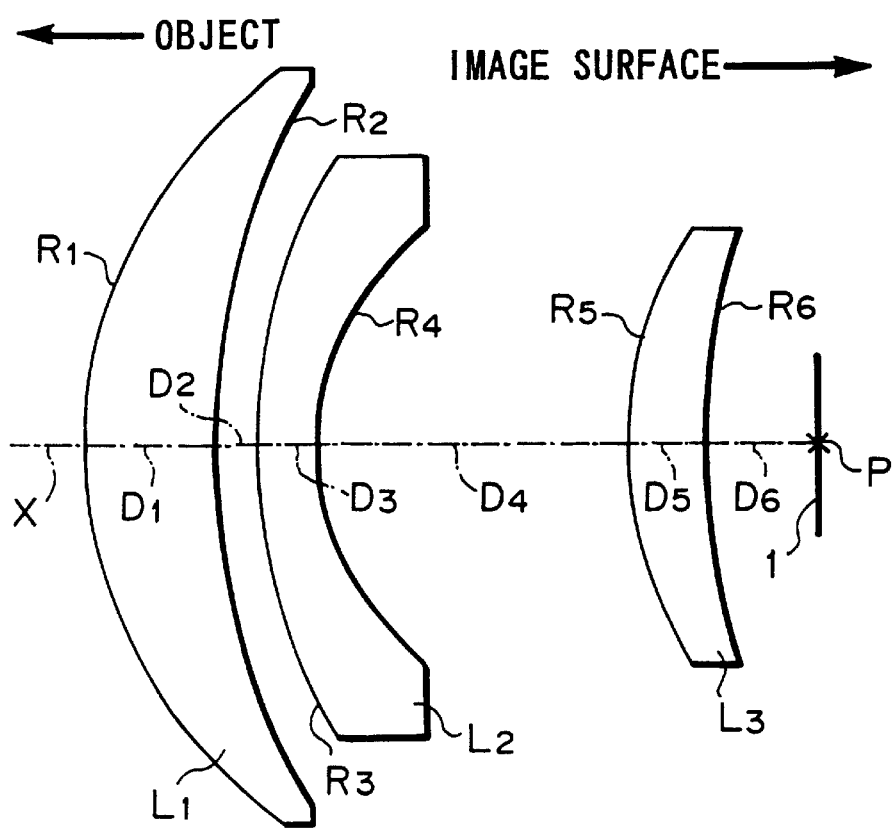
FIGS. 3A and 3B are views showing the lens configuration of the bright wide-angle infrared lens in accordance with Example 3 of the present invention.
Figure 3B:
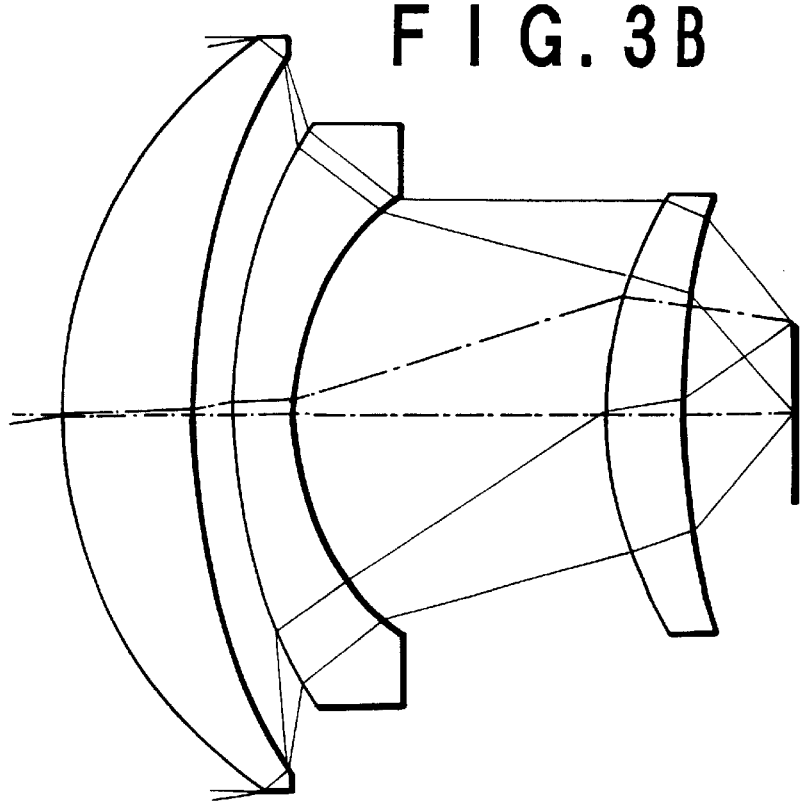

FIG. 3A shows the basic configuration of the bright wide-angle infrared lens in accordance with Example 3. Also, as shown in the ray-tracing view of FIG. 3B, this lens can transmit therethrough substantially 100% of a luminous flux carrying object information without any eclipse up to the marginal part of luminous flux, whereby a bright infrared lens with a wide field of view can be obtained.

Table 3 (follows) shows the radius of curvature R of each lens surface, the axial surface space of each lens (center thickness of each lens and air space between each pair of neighboring lenses) D, the refractive index N of each lens at a wavelength of 10 μm, and the material forming each lens in Example 3. The lower part of Table 3 shows the respective values of individual constants of each aspheric surface indicated in the above-mentioned aspheric surface form expression in Example 3.

Table 4 (follows) shows values of $f_{1-2}/f$, $f_3/f$, and $D_{2-3}/f$ in the bright wide-angle infrared lenses in accordance with Examples 1 to 3. Values of Conditional Expression in Each Embodiment As can be seen from Table 4, Examples 1 to 3 satisfy all of conditional expressions (1) to (3).

FIGS. 4A to 6D are aberration charts showing various kinds of aberration in accordance with Examples 1 to 3. As shown in these charts, it is clear that each Example yields an infrared lens having favorable imaging performances up to its marginal field of view, while having a very high brightness with a F number of 0.65 to 0.70 and a wide angle of view 2ω=17.8° to 20.8°.

Without being restricted to the above-mentioned Examples, the bright wide-angle infrared lens of the present invention can be modified in various manners. For example, the radius of curvature R and lens distance (or lens thickness) D of each lens can be changed as appropriate.

The third lens $L_3$ is not restricted to a meniscus lens, but can be made as a plane-convex lens having a positive refracting power with a convex surface directed onto the object side or a biconvex lens.

Not only the image-surface-side surface but also the object-side surface or both surfaces of the first lens $L_1$ may be formed aspheric.

In accordance with the present invention, a bright wide-angle infrared lens exhibiting favorable imaging performances without any eclipse of luminous flux while having a small F number with a wide field of view can be realized in a compact three-element configuration.

TABLE 1

EXAMPLE 1

| Surface | R | D | N | Material |
|---|---|---|---|---|
| 1 | 90.831 | 27.01 | 4.00318 | germanium |
| *2 | 157.20 | 6.38 | | |
| 3 | 108.95 | 7.20 | 4.00318 | germanium |
| 4 | 55.262 | 62.53 | | |
| 5 | 126.57 | 15.52 | 4.00318 | germanium |
| 6 | 409.42 | 29.25 | | |

Aspheric surface coefficient

| Surface | K | $A_4$ | $A_6$ | $A_8$ | $A_{10}$ |
|---|---|---|---|---|---|
| 2 | 1.1928 | $0.12911 \times 10^{-6}$ | $-0.80487 \times 10^{-11}$ | $0.10648 \times 10^{-14}$ | $-0.45026 \times 10^{-19}$ |

TABLE 2

EXAMPLE 2

| Surface | R | D | N | Material |
|---|---|---|---|---|
| 1 | 104.34 | 27.12 | 4.00318 | germanium |
| *2 | 199.77 | 6.24 | | |
| 3 | 135.51 | 12.00 | 4.00318 | germanium |
| 4 | 66.483 | 68.82 | | |
| 5 | 91.599 | 14.58 | 4.00318 | germanium |
| 6 | 178.70 | 21.62 | | |

Aspheric surface coefficient

| Surface | K | $A_4$ | $A_6$ | $A_8$ | $A_{10}$ |
|---|---|---|---|---|---|
| 2 | 1.1603 | $0.85780 \times 10^{-7}$ | $-0.378780 \times 10^{-11}$ | $0.34736 \times 10^{-15}$ | $-0.96493 \times 10^{-20}$ |

TABLE 3

EXAMPLE 3

| Surface | R | D | N | Material |
|---|---|---|---|---|
| 1 | 95.864 | 25.27 | 4.00318 | germanium |
| *2 | 171.26 | 8.29 | | |
| 3 | 118.72 | 11.77 | 4.00318 | germanium |
| 4 | 57.335 | 62.18 | | |
| *5 | 85.396 | 15.30 | 4.00318 | germanium |
| 6 | 156.24 | 21.70 | | |

Aspheric surface coefficient

| Surface | K | $A_4$ | $A_6$ | $A_8$ | $A_{10}$ |
|---|---|---|---|---|---|
| 2 | 1.1451 | $0.92978 \times 10^{-7}$ | $-0.38623 \times 10^{-11}$ | $0.37479 \times 10^{-15}$ | $-0.70113 \times 10^{-20}$ |
| 5 | 0.9359 | $0.74164 \times 10^{-7}$ | $-0.15056 \times 10^{-10}$ | $-0.76647 \times 10^{-15}$ | $-0.21977 \times 10^{-19}$ |

TABLE 4

Values of conditional expressions in each example

|          | Example 1 | Example 2 | Example 3 |
|----------|-----------|-----------|-----------|
| f        | 100.0     | 100.0     | 100.0     |
| $f_{1-2}/f$ | 2.446  | 2.034     | 2.158     |
| $f_3/f$  | 0.586     | 0.556     | 0.540     |
| $D_{2-3}/f$ | 0.625  | 0.688     | 0.622     |

What is claimed is:

1. A bright wide-angle infrared lens comprising, successively from an object side, a first lens made of a meniscus lens having a positive refracting power with a convex surface directed onto the object side, a second lens made of a meniscus lens having a negative refracting power with a convex surface directed onto the object side, and a third lens having a positive refracting power with a convex surface directed onto the object side, at least one surface of said first lens being formed aspheric.

2. A bright wide-angle infrared lens according to claim 1, satisfying the following conditional expressions (1), (2), and (3):

$$1.50 < f_{1-2}/f \quad (1)$$

$$0.45 < f_3/f < 0.65 \quad (2)$$

$$0.55 < D_{2-3}/f < 0.80 \quad (3)$$

where f is the focal length of the whole system;

$f_{1-2}$ is the composite focal length of the first and second lenses;

$f_3$ is the focal length of the third lens; and $D_{2-3}$ is the air space between the second and third lenses.

3. A bright wide-angle infrared lens according to claim 1, wherein the image-surface-side surface of said first lens is formed aspheric.

4. A bright wide-angle infrared lens according to claim 1, wherein said first, second, and third lenses are formed from germanium and are used for a wavelength band of 8 to 12 μm.

5. A bright wide-angle infrared lens according to claim 1, wherein the object-side surface of said third lens is formed aspheric.

* * * * *